United States Patent [19]

Madern

[11] 4,155,345
[45] May 22, 1979

[54] SOLAR ENERGY PICK-UP

[76] Inventor: Jean-Pierre Madern, Route de Perpignan, Cabestany, France 66330

[21] Appl. No.: 819,462

[22] Filed: Jul. 27, 1977

[30] Foreign Application Priority Data

Aug. 24, 1976 [FR] France ............................ 76 26185
Apr. 18, 1977 [FR] France ............................ 77 11978

[51] Int. Cl.² .................................................. F24J 3/02
[52] U.S. Cl. ................................................... 126/271
[58] Field of Search .............................. 126/270, 271

[56] References Cited

U.S. PATENT DOCUMENTS

| | | | |
|---|---|---|---|
| 3,229,682 | 1/1966 | Perlmutter et al. ................... | 126/271 |
| 3,985,116 | 10/1976 | Kapany ................................ | 126/271 |
| 4,018,211 | 4/1977 | Barr ..................................... | 126/271 |

FOREIGN PATENT DOCUMENTS

| | | | |
|---|---|---|---|
| 2546619 | 4/1976 | Fed. Rep. of Germany .......... | 126/271 |
| 811015 | 1/1937 | France ................................... | 126/271 |
| 1278188 | 10/1961 | France ................................... | 126/270 |
| 2287022 | 4/1976 | France ................................... | 126/271 |

*Primary Examiner*—John J. Vrablik
*Attorney, Agent, or Firm*—Dennison, Dennison, Meserole & Pollack

[57] ABSTRACT

The invention relates to a solar energy pick-up employing a stream of water, comprising an inclined surface on which substantially regular obstacles are arranged against the flow of the water arriving at the top of the inclined surface and collected at the bottom thereof, wherein the walls of the obstacles are reflecting and define channels for the passage of the water, whose depth is greater than five times their width.

3 Claims, 3 Drawing Figures

SOLAR ENERGY PICK-UP

The present invention relates to a so-called "stream-action" solar pick-up employing a stream of water.

Pick-ups employing a stream of water are constituted by a flat, inclined body, facing the sun, and enable the temperature of a fluid flowing over said body to be raised.

However, to ensure good efficiency of the pick-up, the flow of water must be decelerated and the thickness of the film of water on the flat inclined surface must be regularly distributed. On the other hand, loss of heat due to the convectional movements of air provoked by the fall of the water must be avoided, as well as the loss of heat due to the infrared radiation of the heated liquid.

A solar pick-up according to the invention comprises an inclined surface for transferring solar energy to a liquid arriving at the top of said surface, flowing thereon and collecting in the lower part thereof. Obstacles are arranged on the surface in a substantially regular pattern for breaking and uniformly distributing the flow of liquid on the surface. Said obstacles are constituted by thin blades arranged in parallely extending spaced rows generally crosswise on the inclined surface between the top and lower part thereof. The blades of adjacent rows are in staggered relationship to provide deep zig-zag channels for the liquid formed by the spaces between the blades of adjacent rows and between the adjacent blades of each row. The walls of the blades delimiting the channels are heat reflecting and heat conducting with the depth of the channels being greater than five times their width.

The obstacles arranged close to one another on the inclined surface form a plurality of small deep channels. These obstacles break and regularly distribute the descending sheet of liquid into a plurality of small parallel channels disposed in zig-zag fashion over the whole inclined surface.

The decelerated flowing liquid does not cause convectional movements of air such as the ones provoked by falling liquid, and the provision of deep channels having reflecting limiting walls causes the losses by radiation of the heated liquid to be considerably reduced in accordance with the so-called "Francia effect". It has been disclosed by Francia that the calorific losses of the black body may be limited by placing reflecting bodies perpendicularly with respect to the black surface, even if these bodies are made of a transparent material. Note Francia, French Pat. No. 1.321.283.

The obstacles will preferably be made in the form of blades, either of heat-conducting material or plastics material having the same characteristics, for example metallised plastics material. The obstacles could also be made in the form of tufts of fibres by using a carpet whose vertical fibres are distributed in any suitable pattern to delimit channels for the passage of water.

In this way, an absorption of the radiation is obtained in all the surface of the inclined plane; on the one hand, the radiation is converted into calorific energy directly in contact with the water flowing in the bottom of the channels; on the other hand, the calorific energy is also conducted to the liquid by conductivity of the metal or plastics material employed for making the vertical blades forming the walls of the channels.

The invention will be more readily understood on reading the following description with reference to the accompanying drawings, in which:

FIG. 1 shows obstacles h in the form of thin blades regularly arranged close to one another on an inclined surface S in parallely extending spaced rows. The blades of adjacent rows are in staggered relationship so that the spaces c between adjacent rows and the passages b, d between adjacent blades of each row form zig-zag channels for the liquid entering at a.

Figure 3:
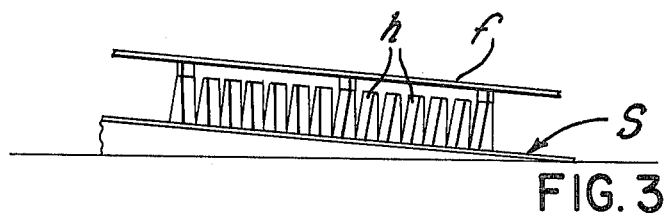
FIG. 3 shows a schematic view of the inclined solar pick-up.
Figure 1:
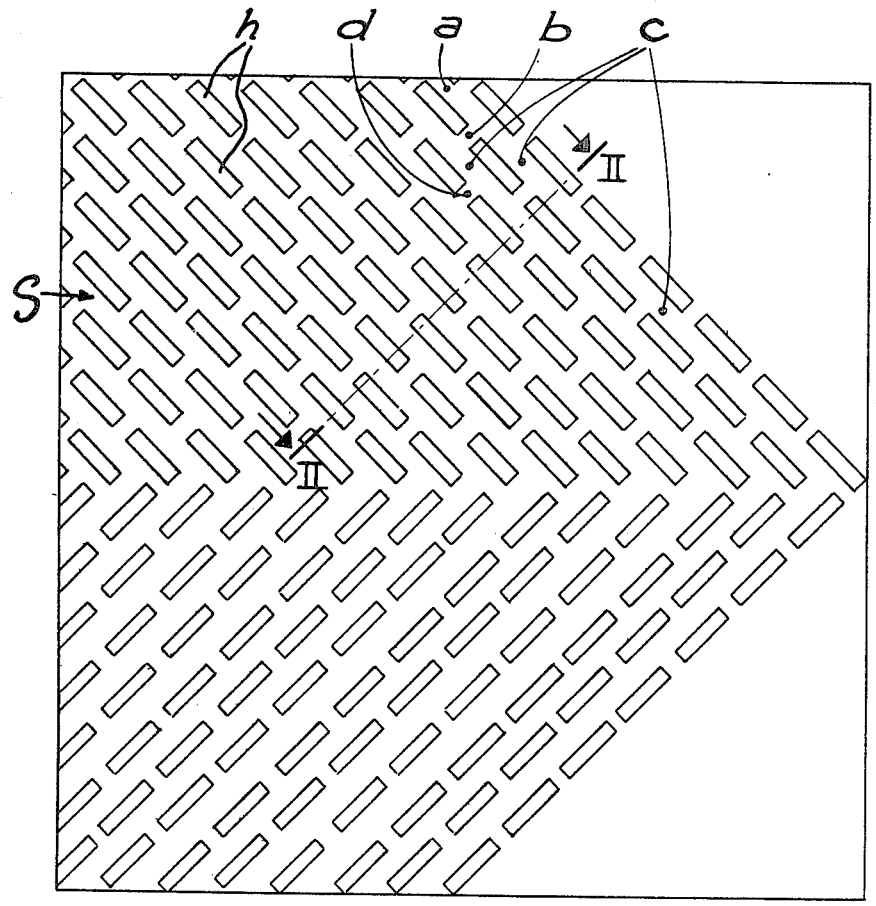
FIG. 1 shows a plan view of a solar pick-up according to the invention.
Figure 2:
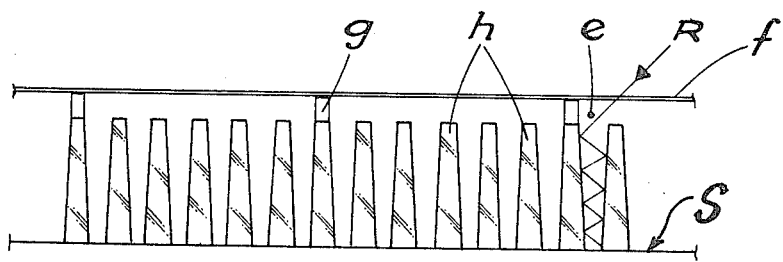
FIG. 2 is a sectional view generally along II—II of FIG. 1 with the obstacles illustrated in elevation.

The facing plane walls of the blades delimiting the channels are reflecting and the height and spacing of the blades are such that the depth of the channels is greater than five times their width.

The walls limiting the channels are heat-conducting. This is obtained by providing blades h made of heat-conducting material or metallized plastics material.

The radiation R enters at e and is reflected on the walls without being able to leave.

Finally, it is advantageous to provide a transparent cover f which may be supported by lugs g projecting with respect to the upper plane of the obstacles h. The cover being stretched and supported on the lugs, there is an air gap between the top of the obstacles and the transparent cover.

What is claimed is:

1. A solar pick-up comprising an inclined surface for transferring solar energy to a liquid arriving at the top of said surface, flowing thereon and collected in the lower part thereof, and obstacles arranged on said surface in a substantially regular pattern for breaking and uniformly distributing the flow of liquid on said surface, said obstacles being constituted by thin blades arranged in parallely extending spaced rows generally crosswise on the inclined surface between the top and lower part thereof, the blades of adjacent rows being in staggered relationship to provide deep zig-zag channels for said liquid formed by the spaces between the blades of adjacent rows and between the adjacent blades of each row, the walls of said blades delimiting said channels being reflecting and heat conducting and the depth of said channels being greater than five times their width.

2. The pick-up of claim 1, wherein the blades are made of metallised plastics material.

3. The pick-up of claim 1, wherein a transparent cover is disposed above and near the tops of the obstacles.

* * * * *